April 28, 1925.　　　　　　　　　　　　　　　1,535,566.
J. J. BOLAND
CLUTCH TRANSMISSION
Filed June 18, 1920　　　　2 Sheets-Sheet 1

Inventor
Joseph J. Boland
By his Attorney
Warren S. Orton.

April 28, 1925.

J. J. BOLAND 1,535,566

CLUTCH TRANSMISSION

Filed June 18, 1920

Inventor
Joseph J. Boland.
By his Attorney
Warren S. Orton.

Patented Apr. 28, 1925.

1,535,566

UNITED STATES PATENT OFFICE.

JOSEPH J. BOLAND, OF RAHWAY, NEW JERSEY, ASSIGNOR TO AEROMARINE PLANE AND MOTOR COMPANY, A CORPORATION OF NEW YORK.

CLUTCH TRANSMISSION.

Application filed June 18, 1920. Serial No. 390,050.

*To all whom it may concern:*

Be it known that I, JOSEPH J. BOLAND, a citizen of the United States, and resident of Rahway, in the county of Union and State of New Jersey, have invented certain new and useful Improvements in Clutch Transmissions, of which the following is a specification.

The invention relates in general to a clutch transmission of general application wherever it is desired to transmit rotary power from a driving to a driven member and the invention specifically relates to an improvement in clutching devices in power transmitting plants of the class where the driven member is maintained in operative driving connection only under those conditions where the speed of the driving member is equal to, or in excess of, the speed of the driven member. The invention in its specific application illustrated in this disclosure, constitutes part of the driving connection between a starting motor and the engine shaft of an internal combustion engine constituting part of an automobile or aeroplane power system.

The invention contemplates the utilization of a driving member, a driven member preferably in the form of a clutch drum and one or more coacting clutching members carried by the driving member and moved positively into operative engagement with the drum to maintain a one-way driving connection between the driving member and the driven drum under certain operative conditions.

The primary object of the invention is to provide in such a construction an improved means for actuating the clutching member or members as the case may be, and which will positively and promptly connect the driven and driving members under operative conditions controlled by the driving member. This object is attained in the illustrated embodiment of the invention as soon as the driving member tends to overrun the speed of the driven member. The invention also includes a form of clutch member which will permit the prompt movement of the clutch into an inoperative position, under any condition which might cause the driven member to overrun the speed of the driving member or under the condition in which the driven member tends to decelerate or reverse its speed, such as is caused by a back fire in the engine.

I attain the primary object of the invention by controlling the operative engagement of the clutching member, or members, by means of a cam form of actuator having a limited freedom of rotary movement and which, by its tendency to maintain its inertial status relative to the driving member, will automatically effect the desired position of the clutching member relative to the driven drum.

More specifically defined the tendency of the cam while standing still in the organization disclosed, is to permit the driving element to revolve the clutching members idly about the controlling face of the cam and then to cause the members to be moved thereby into clutching engagement with the drum just prior to the positive engagement of the driving member with the cam to rotate the same. Again considering the condition where the cam is rotating under its own inertia and free to move beyond the driven member, or where the driven member is reversing in direction, the tendency of the moving cam is to remove its controlling face from its locking engagement with the actively disposed clutching member and thus permit the clutching member to move into an inoperative position disengaging itself from the drum.

Another object of the invention is to provide a simplified, compact organization of parts in which the parts are reduced in number from similar devices now known and in which practically all of the operative parts become idle automatically when the driven member becomes operative under its own power.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings.

Figure 1:
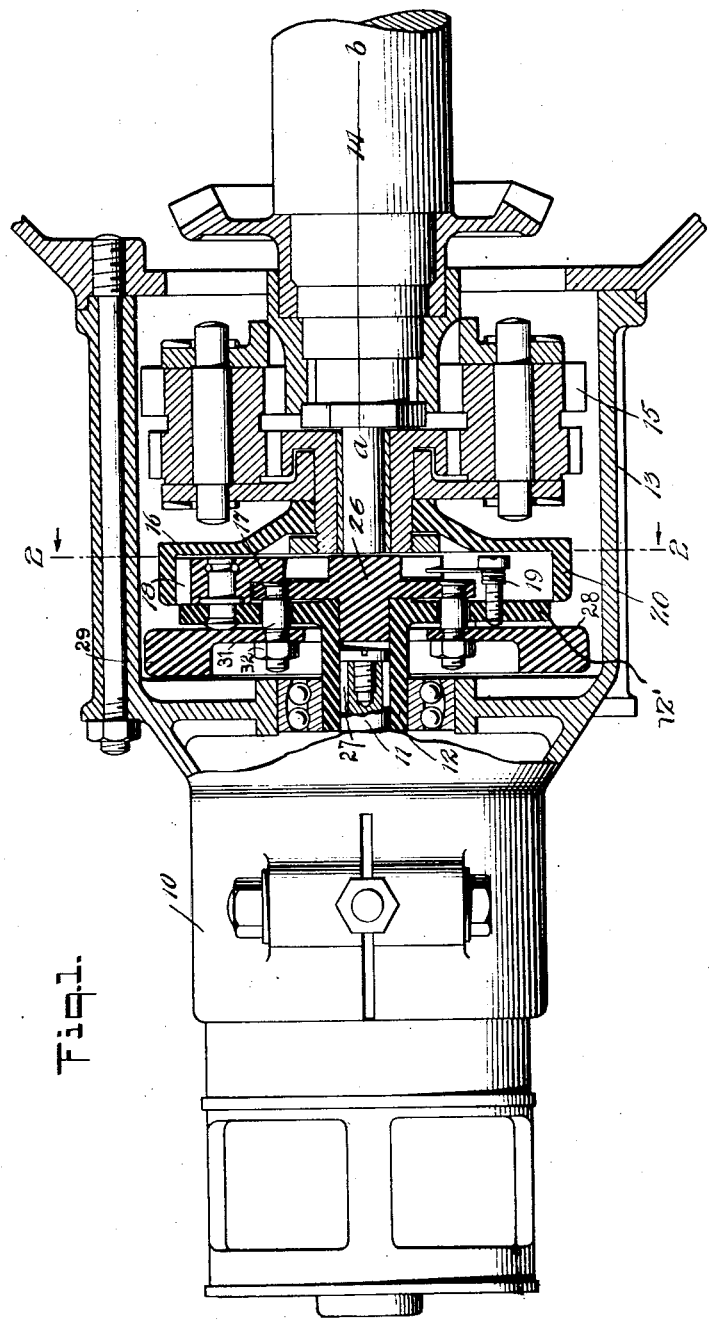
Figure 1 is a view partially in axial section through an extension from a starter motor illustrating a preferred embodiment of the invention and shown in operative engagement with a driven shaft through a gear connection and taken on the line 1—1 of Figure 2.

In the following description and in the claims, parts will be identified by specific names for convenience of expression but they are intended to be as generic in their application to similar parts as the art will permit.

In the organization shown in accompanying drawings, there is illustrated a power creating member herein shown as an electric starter motor 10 to the armature shaft 11 of which is secured a long sleeve 12 with its end in the form of an outstanding flange 12' specifically referred to as a clutch hub flange and which sleeve and flange are hereinafter referred to as the driving member. The hub flange and its associated mechanism is contained within a casing 13 constituting an extension from the motor. Into the opposite end of the casing extends the shaft 14 of an internal combustion engine. The shaft 14 is operatively connected through change speed gears 15, forming no part of this invention, with a drum 16 hereinafter referred to specifically as the driven member of the claimed combination. The flange 12' carries on its advanced face which is disposed perpendicular to the axis of rotation of the system indicated by the line $a$—$b$ a plurality of dogs 17 herein shown to be three in number and equally spaced circumferentially of the flange and about the axis of rotation. The dogs 17 carry rollers 18 held to the same by springs 19 to form the well known form of roller clutches which extend within the outlines of the drum and are designed to engage the inner periphery of the flange 20 of the same to rotate the driven parts positively in the direction indicated by the arrow in Figure 2.

The dogs are provided with long inwardly extending cam engaged extensions 21 which are maintained in bearing engagement with circumferentially spaced apart points on the periphery 22 of a centrally positioned cam 23 by means of weak springs 24.

The cam illustrated is of a simple two-throw six sides type with one set of throws for each of the extensions 21. On the cam periphery a depression succeeds a high point circumferentially and the high points are in the form of flat surfaces 25 for engaging the extensions 21 of the dogs to hold the rollers carried thereby in frictional bearing engagement with the flange 20 of the drum.

This form of clutch is illustrated merely to feature an arrangement in which the drum when revolving in the indicated direction under its own force can slip freely by the clutch without interference therefrom but it is not intended that any particular form of clutch be featured in this disclosure and the invention relates more particularly to the means for actuating the clutch rather than to the clutch mechanism per se.

The cam actuator is provided with an axially centered hub 26 which is loosely mounted within the hollow bore 27 of the clutch hub flange 12' so that the cam actuator is free for rotary movement relative to the drum 16 and is partially free for rotary movement relative to the driving member 12. A fly-wheel 28 provided with a heavy, outlining rim 29 to increase its fly-wheel effect, encircles the member 12 and due to its function in this disclosure, will be identified hereinafter as the inertia wheel. The hub flange 12' which fits between the actuator and the inertia wheel is provided with three arcuate slots 30 extending circumferentially about the axis of rotation and equally spaced apart as shown in Figure 2.

Figures 2, 3:
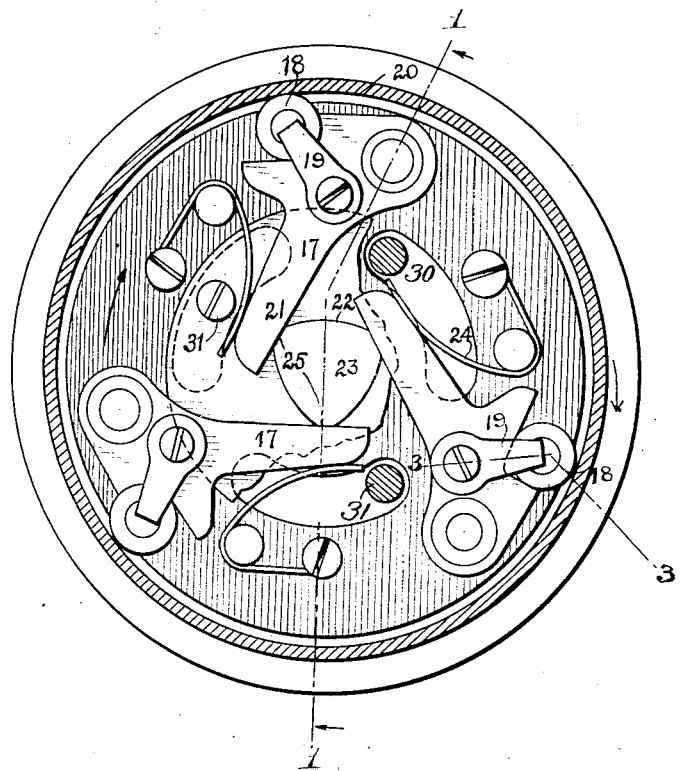
Figure 2 is a transverse sectional view taken on the line 2—2 of Figure 1 and with parts broken away to show the actuator.
Figure 3 is an enlarged transverse sectional view through one of the roller mountings and taken on the line 3—3 of Figure 2.

Pins 31 fastened to the outwardly extending flange of the actuator, extend parallel to the axis of rotation $a$—$b$, are passed through the slots 30, as shown in Figure 2, and are passed through the inertia wheel and secured thereto by means of nuts 32. By this construction it is seen that the clutch controlling cam and the inertia wheel are connected so as to form, in effect, a single inertially controlled member hereinafter identified as an actuator. This actuator posesses a limited freedom of rotary movement relative to the driving member for an angular distance equal to the lengths of the slots 30.

In operation, and assuming first, that the parts are in the position shown in Figure 1 and that it is desired to start the shaft 14 rotating, the motor 10 is set in operation as is usual in starting devices of the class disclosed.

The initial turning movement of the armature shaft of the motor will cause the driving member 12 to move to an extent to bring the pins 31 to the ends of the slots shown in Figure 2. During this initial movement, it will be understood of course that the inertia of the actuator will cause it to remain relatively stationary in space and to revolve the dogs about the axis $a$—$b$ and cause the same to travel in an arc concentric with the axis of the stationary drum. As the revolving members 21 of the dogs slide from the low to the high points of the cam, the cam will react on the dogs to move the rollers 18 into clutching engagement with the inner face of the flange of the drum. The parts are so proportioned that the clutching rollers are held clear from engagement with the drum by the springs 19 and rest in their recesses at or just prior to the engagement of the driving member with the pins 31, so that the driving member acts through the actuator to bring the rollers in contact with the drum when they will roll a sufficient distance along the flat surfaces of the dogs to hold the clutching members positively in their driving relation with the drum. This condition will persist as long as the driving member has a speed equal to or tending to be in excess of the speed of the driven member. There is thus effected a positive driving relation between the driving and driven members through the clutching members which in this disclosure are of the conventional roller clutch type.

Should the shaft 14 begin to turn forwardly under its own power, as when the shaft is part of an actively disposed internal combustion engine and the speed of the drum tends to exceed the speed of the driving member, the drum will tend of course to slip past the clutching members. This slipping action is permitted by the construction of the one-way clutching members illustrated. It will be appreciated that the inertially controlled actuator will tend, in turning under its acquired momentum, to exceed the speed of the driving member and thus turn the low points of the cam into opposition to the extensions 21 of the dogs. This will tend to release the engagement of the rollers with the drum and the rollers will slip back from the drum and into the position initially assumed in this description. It is of course appreciated that the same relative conditions would arise when the starting motor is shut off, for the friction of the brushes, bearings, etc. would cause the armature shaft to lag and come to rest while the inertially controlled actuator continues to bring the forward end of the slots to the forward position and thus permit the disengaging of the clutching members.

It is further appreciated that should the engine connected to the shaft 14 begin to rotate backwards the clutching members being at the time engaged, as might happen in the event of a premature explosion, the change of direction would cause the actuator to take up a position to cause the cam to rotate to bring the pins to the forward ends of the slot thus releasing the clutching members.

By means of a device of this character it it is possible to cause the clutch to act instantaneously and to accomplish movements which could not be taken care of by any other known form of device. The clutching member possesses the advantage of being able to permit the withdrawal of the rollers from the drum a sufficient distance to prevent all possibility of a contact when not supposed to be in operation.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described. the combination with a driving member, a driven member at all times free to move in either direction and a roller clutching mechanism for effecting a driving relation therebetween when the driving member is driving the driven member, an inertially controlled actuator for controlling the clutching mechanism, said actuator being free to move in space independently of both of said members in at least one direction under its own inertia, and means for automatically coupling the driving member with the actuator to move the same mechanically when the speed of the driving member exceeds the speed of the actuator, said clutching mechanism including means for releasing the same automatically from its operative position when free of the control of the actuator.

2. In a device of the class described, the combination with a driving member, a driven member and a plurality of clutching mechanisms for effecting a driving relation therebetween, an actuator cam for simultaneously controlling all of the clutching mechanisms, said actuator cam being free to move in space for a limited distance in at least one direction under its own inertia, and means for automatically coupling the driving member with the actuator cam to move the same mechanically when the speed of the driving member exceeds the speed of the actuator, said clutching mechanism including means for promptly releasing the same automatically from its operative position when the speed of the driving member becomes less than the speed of the driven member.

3. In a device of the class described, the combination with a driving member, a driven member and a clutching mechanism for effecting a one-way driving relation therebetween, said driven member being otherwise free of the clutching mechanism to rotate in either direction, an actuator for controlling the clutching mechanism, said actuator being free to move in space in at least one direction under its own inertia, means for automatically coupling the driving member with the actuator to move the same mechanically when the speed of the driving member exceeds the speed of the actuator and means controlled by the relative rotary movement of the driving member and the actuator for causing said clutching mechanism to function and controlled by the relative movement of the driven member and the actuator for causing said clutching mechanism to become inoperative.

4. In a clutch mechanism, the combination with a driving member, a driven member, clutching means for effecting a driving connection therebetween and a spring acting normally on said clutching means tending to move the same positively into an inoperative position, of inertially operated means normally acting on said clutching means to maintain the same in operative position and controlled by a deceleration of the driven member for removing itself from the clutching means and thus permit the spring to function.

5. In a clutch mechanism, the combination with a driving member, a driven member, means for effecting a one-way driving connection therebetween while permitting a freedom of relative movement in the opposite direction, of inertially operated means for controlling said connecting means and means controlled by the relative movement of said inertially operated means and said driven member for causing said connecting means to become functionally inoperative.

6. In a clutch mechanism, the combination with a driving member, a driven member and means for effecting a one-way driving connection therebetween, of inertially operated means for causing said driving connection to become operative when the speed of the driving member exceeds the speed of the inertially operated means and to cause the driving connection to become inoperative promptly when the driven member starts to reverse.

7. In a clutch mechanism, the combination with a driving member, a driven member and means for effecting a one-way driving connection therebetween, of inertially operated means for causing said driving connection to become operative when the speed of the driving member exceeds the speed of the inertially operated means and for causing the same to become inoperative when the speed of the inertially operated means exceeds the speed of the driven member.

8. In a device of the class described, the combination of a driving member mounted for rotary movement about an axis of rotation, a clutching member carried thereby, a drum adapted to be rotated by the engagement therewith of said clutching member, an inertially controlled cam having a limited freedom of rotary movement relative to the driving member about said axis and adapted to engage the clutching member carried by the driving member to move the clutching member into its drum clutching position.

9. In a device of the class described, the combination of a driving member mounted for rotary movement about an axis of rotation, a clutching member carried thereby, a drum adapted to be rotated by the engagement therewith of said clutching member, resilient means tending to maintain the clutching member in inoperative position, a cam having a limited freedom of rotary movement relative to the driving member about said axis and adapted to engage the clutching member carried by the driving member to move the clutching member into its drum clutching position and against the tension of said resilient means, said cam having a mass capable of acquiring an inertial momentum sufficient to cause the same to act on said clutching member to change its position relative to the drum.

10. In a device of the class described, the combination of a driving member, mounted for rotary movement about an axis of rotation, a clutching member carried thereby, a drum adapted to be rotated by the engagement therewith of said clutching member, an inertially controlled cam having a limited freedom of rotary movement relative to the driving member about said axis and adapted to engage the clutching member carried by the driving member to move the clutching member into its drum clutching position and an inertia wheel secured to said cam.

11. In a device of the class described, the combination of a driving member mounted for rotary movement about an axis of rotation, a clutching member carried thereby, a driven member adapted to be rotated by the engagement therewith of said clutching member, an inertially controlled cam having a limited freedom of rotary movement relative to the driving member about said axis and having a peripheral cam face with succeeding high and low points adapted to engage the clutching member carried by the driving member to move the clutching member into its clutching position and to permit the clutching member to be moved free of the driven member.

12. In a device of the class described, the combination with a driving member, and a driven member, one of which is in the form of a drum and the other of which is provided with a roller clutch member for engaging the drum and thus effecting a one-way driving connection, said clutch member including a lever and resilient means acting thereon for rendering the clutch inoperative when the relative movement of the driving and driven members is in one direction, and inertially actuated means operatively connected to the clutch lever for moving the clutch into operative position against the action of said resilient means when the relative movement of the driving and driven members is in the opposite direction and with the driving member tending to exceed the speed of the driven member.

13. In a one-way clutch mechanism, the combination with a driving member and a driven member having a common axis of rotation, of an automatically actuated clutch device carried by one of the members and adapted to constitute the driving connection between the members, an inertially controlled actuator mounted for rotary movement about said axis, and having a peripheral cam face of succeeding high and low points considered circumferentially, said high points adapted to engage the clutch device to move the same into operative position and said low points being spaced from the clutch device a distance to permit the same to move into an inoperative position.

14. In a device of the class described, the combination with a driving member, a driven member and a driving connection therebetween adapted to provide a positive rigid drive between the members, locking means adapted to be shifted into bearing engagement with said driving connection to secure the same in its driving position and said locking means being responsive to any deceleration of the driven member for promptly removing said locking means from its bearing engagement with the driving connection thereby to permit the connection to become inoperative with the driving and driven members free for relative rotary movement.

15. In an engine starter, the combination with an engine to be started, a source of power and a one-way normally rigid driving connection between the engine and said source, of means automatically responsive to a deceleration of the engine speed while continuing to turn forwardly for promptly causing said connection to become inoperative.

16. In an engine starter, the combination with an engine to be started, a source of power and a one-way driving connection between the engine and said source, of means acting on the connection and tending normally to maintain the same in an inoperative position and means controlled by an acceleration of the speed of the power member for promptly moving the connection into operative position and controlled by a deceleration of the speed of the engine for permitting said connecting means to become inoperative whereby the source of power is completely disconnected from the engine in case of back fire.

17. In an engine starter, the combination with a source of power, a driven member adapted to be connected to the engine, and means for effecting a driving connection therebetween, of inertially controlled means automatically responsive to a deceleration of the driven member for causing said driving connection to become ineffective and thus completely intercepting the driving relation between the power member and the driven member.

Signed at Keyport in the county of Monmouth and State of New Jersey this sixteenth day of June A. D. 1920.

JOSEPH J. BOLAND.